United States Patent
Daniel et al.

(10) Patent No.: US 11,065,707 B2
(45) Date of Patent: Jul. 20, 2021

(54) SYSTEMS AND METHODS SUPPORTING PREDICTIVE AND PREVENTATIVE MAINTENANCE

(71) Applicant: Lincoln Global, Inc., Santa Fe Springs, CA (US)

(72) Inventors: Joseph A. Daniel, Sagamore Hills, OH (US); William T. Matthews, Chesterland, OH (US); Lance F. Guymon, Fort Collins, CO (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 177 days.

(21) Appl. No.: 16/115,778

(22) Filed: Aug. 29, 2018

(65) Prior Publication Data

US 2019/0163172 A1 May 30, 2019

Related U.S. Application Data

(60) Provisional application No. 62/592,072, filed on Nov. 29, 2017.

(51) Int. Cl.
*B23K 9/12* (2006.01)
*B23K 9/095* (2006.01)
(Continued)

(52) U.S. Cl.
CPC .............. *B23K 9/126* (2013.01); *B23K 9/091* (2013.01); *B23K 9/095* (2013.01); *B23K 9/0953* (2013.01);
(Continued)

(58) Field of Classification Search
None
See application file for complete search history.

(56) References Cited

U.S. PATENT DOCUMENTS

| 4,642,752 A | 2/1987 | Debarbieri et al. |
| 4,952,772 A | 8/1990 | Zana |

(Continued)

FOREIGN PATENT DOCUMENTS

| CN | 104741778 B | 7/2015 |
| CN | 106772243 A | 5/2017 |

(Continued)

OTHER PUBLICATIONS

Extended European Search Report from Corresponding Application No. 18208892.2; dated Dec. 16, 2019; pp. 1-13.

(Continued)

*Primary Examiner* — Mohammad Ali
*Assistant Examiner* — Saad M Kabir
(74) *Attorney, Agent, or Firm* — David J. Muzilla

(57) ABSTRACT

Embodiments of systems and methods for supporting predictive and preventative maintenance are disclosed. One embodiment includes manufacturing cells within a manufacturing environment, where each manufacturing cell includes a cell controller and welding equipment, cutting equipment, and/or additive manufacturing equipment. A communication network supports data communications between a central controller and the cell controller of each of the manufacturing cells. The central controller collects cell data from the cell controller of each of the manufacturing cells, via the communication network. The cell data is related to the operation, performance, and/or servicing of a same component type of each of the manufacturing cells to form a set of aggregated cell data for the component type. The central controller also analyzes the set of aggregated cell data to generate a predictive model related to future maintenance of the component type.

10 Claims, 12 Drawing Sheets

(51) Int. Cl.

| | |
|---|---|
| *B23K 9/127* | (2006.01) |
| *B25J 9/16* | (2006.01) |
| *B23K 9/10* | (2006.01) |
| *G05B 19/418* | (2006.01) |
| *B23K 31/00* | (2006.01) |
| *B23K 31/12* | (2006.01) |
| *B23K 37/00* | (2006.01) |
| *B25J 11/00* | (2006.01) |
| *B23K 9/09* | (2006.01) |
| *B23K 9/133* | (2006.01) |
| *B23K 10/02* | (2006.01) |
| *B23K 26/342* | (2014.01) |
| *B23K 15/00* | (2006.01) |
| *B23K 9/04* | (2006.01) |

(52) U.S. Cl.
CPC .......... *B23K 9/0956* (2013.01); *B23K 9/1062* (2013.01); *B23K 9/1087* (2013.01); *B23K 9/127* (2013.01); *B23K 9/1276* (2013.01); *B23K 9/133* (2013.01); *B23K 31/003* (2013.01); *B23K 31/125* (2013.01); *B23K 37/00* (2013.01); *B25J 9/163* (2013.01); *B25J 9/1661* (2013.01); *B25J 9/1664* (2013.01); *B25J 11/005* (2013.01); *G05B 19/41875* (2013.01); *B23K 9/04* (2013.01); *B23K 10/027* (2013.01); *B23K 15/0086* (2013.01); *B23K 26/342* (2015.10); *G05B 2219/31087* (2013.01); *G05B 2219/32194* (2013.01); *G05B 2219/32234* (2013.01); *G05B 2219/32397* (2013.01); *G05B 2219/45104* (2013.01)

(56) References Cited

U.S. PATENT DOCUMENTS

| | | | |
|---|---|---|---|
| 5,887,122 | A | 3/1999 | Terawaki et al. |
| 6,335,511 | B1 | 1/2002 | Rothermel |
| 6,429,404 | B1 | 8/2002 | Suzuki |
| 6,583,386 | B1 | 6/2003 | Ivkovich |
| 8,710,404 | B2 | 4/2014 | Ma et al. |
| 8,886,359 | B2 | 11/2014 | Inaba et al. |
| 9,302,397 | B2 | 4/2016 | Kimoto |
| 9,965,973 | B2 | 5/2018 | Peters et al. |
| 2003/0046382 | A1 | 3/2003 | Nick |
| 2008/0083716 | A1 | 4/2008 | Shigeyoshi |
| 2009/0179021 | A1 | 7/2009 | Nishimura et al. |
| 2012/0234812 | A1 | 9/2012 | Ma et al. |
| 2014/0001168 | A1 | 1/2014 | Cole |
| 2014/0042136 | A1 | 2/2014 | Daniel et al. |
| 2014/0144896 | A1 | 5/2014 | Einav et al. |
| 2014/0263233 | A1 | 9/2014 | Peters et al. |
| 2016/0214198 | A1 | 7/2016 | Hsu |
| 2016/0361774 | A9 | 12/2016 | Daniel et al. |
| 2017/0046975 | A1 | 2/2017 | Becker et al. |
| 2018/0088567 | A1* | 3/2018 | Li ............ G05B 19/41885 |

FOREIGN PATENT DOCUMENTS

| | | |
|---|---|---|
| CN | 105728904 B | 1/2018 |
| CN | 207358424 U | 5/2018 |
| JP | S 58 168475 A | 3/1982 |
| JP | 5 421172 A | 2/2014 |
| WO | 90/00108 A1 | 1/1990 |
| WO | 2011/039542 A1 | 4/2011 |
| WO | 2013/160745 A1 | 10/2013 |
| WO | 2015/066592 A1 | 5/2015 |
| WO | 2016/064660 A1 | 4/2016 |
| WO | 2016/075518 A1 | 5/2016 |
| WO | 2016/090903 A1 | 6/2016 |

OTHER PUBLICATIONS

Partial European Search Report from Corresponding Application No. 18208892.2; dated Jun. 12, 2019; pp. 1-13.
Extended European Search Report from Corresponding Application No. 18208898.9; dated Sep. 17, 2019; pp. 1-7.
Extended European Search Report from Corresponding Application No. 18208880.7; dated Sep. 17, 2019; pp. 1-8.
International Search Report from Corresponding Application No. PCT/IB2018/001359; dated Mar. 29, 2019; pp. 1-13.
Regaard, et al.; "Seam-tracking for high precision laser welding applications—Methods, restrictions and enhanced concepts"; Journal of Laser Applications; vol. 21, No. 4; Nov. 2009; pp. 1-14.
Zhang, et al.; "Measurement of Three-Dimensional Welding Torch Orientation for Manual Arc Welding Process:" Measurement Science and Technology; vol. 25; Feb. 2014; pp. 1-19.
Lincoln Electric; "Robotics: Joint Sensing Technologies;" https://www.lincolnelectric.com/nl-nl/support/process-and-theory/Pages/intelligent-robotic-detail.aspx; Accessed on Jul. 13, 2018; pp. 1-6.
Garasic; "Sensors and their classification in the fusion weldingtechnology;" Tehnički vjesnik; vol. 22, 4; Aug. 2015; pp. 1-7.
Weldobot; "WOB101;" http://weldobot.com/?portfolio=wob; Accessed on Jul. 10, 2018; p. 1.
Liu, et al.; "Linear Mathematical Model for Seam Tracking with an Arc Sensor in P-GMAW Processes;" Sensors (Basel); vol. 17(3); Mar. 2017; pp. 1-13.
Kim, et al.; "Arc Characteristics in Pulse-GMA Welding with Acute Groove Angles;" Supplement to the Welding Journal; Apr. 2012; pp. 101-105.
Wang; "Intelligent Predictive Maintenance (IPdM) System—Industry 4.0 Scenario;" WTT Transactions on Engineering Sciences; vol. 113; dated Feb. 1, 2016; pp. 1-10.
Extended European Search Report from Corresponding Application No. EP20171703.0; dated Aug. 20, 2020; pp. 1-8.
Extended European Search Report from Corresponding Application No. EP20171722.0; dated Oct. 13, 2020; pp. 1-8.

* cited by examiner

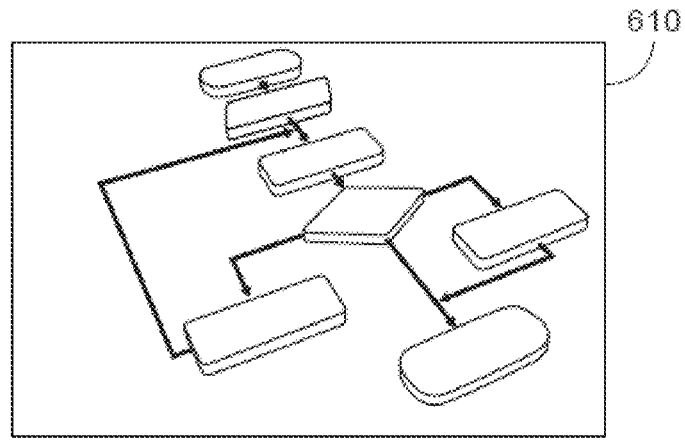
FIG. 6A
$$f(x) \quad \frac{1}{\sigma\sqrt{2\pi}} e^{-\frac{1}{2}\left(\frac{x-u}{\sigma}\right)^2}$$
FIG. 6B
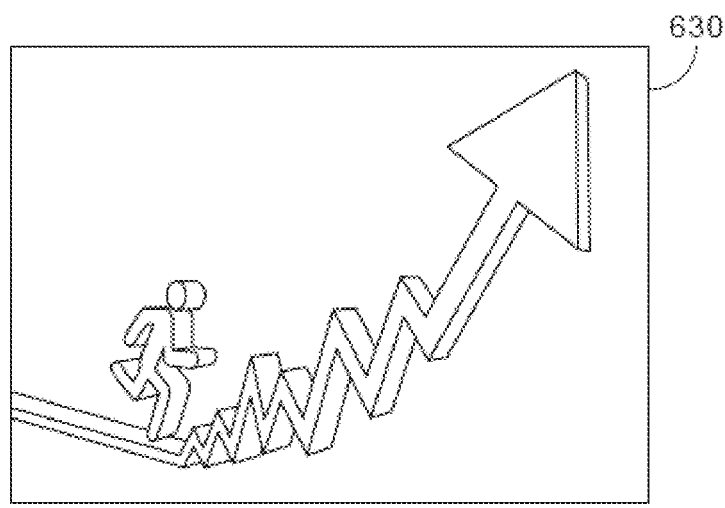
FIG. 6C

SYSTEMS AND METHODS SUPPORTING PREDICTIVE AND PREVENTATIVE MAINTENANCE

CROSS REFERENCE TO RELATED APPLICATIONS/INCORPORATION BY REFERENCE

This U.S. Patent Application claims priority to and the benefit of U.S. Provisional Patent Application Ser. No. 62/592,072, filed on Nov. 29, 2017, the disclosure of which is incorporated herein by reference in its entirety.

FIELD

Embodiments of the present invention relate to predictive and preventative maintenance, and more specifically to systems and methods supporting predictive and preventative maintenance in a manufacturing environment.

BACKGROUND

Maintaining equipment in a manufacturing environment can be logistically challenging. The various components of the equipment can exhibit different failure mechanisms and have different maintenance needs, depending on the nature of the manufacturing environment. Attempting to determine when a particular component of a particular piece of equipment in a particular manufacturing environment should be serviced or replaced can be very difficult. As a result, maintenance schedules are often developed that end up having components serviced or replaced too soon, which wastes time and money. Similarly, maintenance schedules may be developed that end up having components serviced or replaced too late, resulting in unexpected failures of the components and lengthy down times of equipment within the manufacturing environment.

SUMMARY

Embodiments of the present invention include systems and methods related to predictive and preventative maintenance in a manufacturing environment.

One embodiment includes a system supporting predictive and preventative maintenance. The system includes multiple manufacturing cells within a manufacturing environment. The multiple manufacturing cells are robotic manufacturing cells, in accordance with one embodiment. Each manufacturing cell of the multiple manufacturing cells includes a cell controller and at least one of welding equipment, cutting equipment, or additive manufacturing equipment. The system also includes a central controller and a communication network operatively connected to the central controller and the multiple manufacturing cells. The communication network is configured to support data communications between the central controller and the cell controller of each of the multiple manufacturing cells. The central controller is configured to collect cell data from the cell controller of each of the multiple manufacturing cells, via the communication network. The cell data is related to at least one of operation, performance, or servicing of a same component type of each of the multiple manufacturing cells to form a set of aggregated cell data for the component type. The central controller is also configured to analyze the set of aggregated cell data to generate a predictive model related to future maintenance of the component type. The predictive model includes at least one of a predictive algorithm, a predictive equation, or predictive trend data. In one embodiment, the central controller is configured to communicate the predictive model, via the communication network, to the cell controller of each of the multiple manufacturing cells, respectively. The cell controller of each of the multiple manufacturing cells is configured to, respectively, execute the predictive model to determine when a component of the component type should be serviced or replaced. In one embodiment, the central controller is configured to execute the predictive model to determine when a component of the component type should be serviced or replaced for each of the multiple manufacturing cells, respectively, and report when the component should be serviced or replaced to each of the multiple manufacturing cells, respectively, via the communication network. The component of the component type is associated with the welding equipment, the cutting equipment, or the additive manufacturing equipment and may include, for example, one of a contact tip, a gas nozzle, a wire conduit, a wire liner, an electrical cable, a wire drive roll, a tool fixture or clamp, an air filter, or a robot joint. The multiple manufacturing cells may be robotic manufacturing cells or semi-automatic manufacturing cells. In accordance with one embodiment, the system includes at least one sensor associated with a component of the component type in each of the multiple manufacturing cells, respectively. The sensor is configured to sense at least one parameter associated with the operation, the performance, or the servicing of the component and report the parameter, directly or indirectly, to the respective cell controller as the cell data. In one embodiment, the central controller is configured to send messages, via the communication network, to at least one mobile communication device associated with at least one maintenance person indicating when a component of the component type should be serviced or replaced. In accordance with one embodiment, the communication network is configured to facilitate wireless communication between the central controller and each cell controller of the multiple manufacturing cells.

One embodiment includes a system allowing maintenance to be delayed. The system includes multiple manufacturing cells within a manufacturing environment, wherein each manufacturing cell of the multiple manufacturing cells includes a cell controller and welding equipment. The system also includes a central controller and a communication network operatively connected to the central controller and the multiple manufacturing cells. The communication network is configured to support data communications between the central controller and the cell controller of each of the multiple manufacturing cells. The central controller is configured to collect weld data from the cell controller of each of the multiple manufacturing cells, via the communication network. The weld data is related to a sequence of welds generated by the welding equipment on a same type of part being manufactured in each of the multiple manufacturing cells, to form a set of aggregated weld data for the multiple manufacturing cells. The central controller is also configured to analyze the set of aggregated weld data to identify at least one weld of the sequence of welds that is experiencing degradation due to at least one component of the welding equipment being degraded. In accordance with one embodiment, the central controller is configured to generate a set of updated welding parameters associated with generating at least one weld of the sequence of welds to counter the degradation, and communicate the set of updated welding parameters, via the communication network, to the cell controller of at least one manufacturing cell of the multiple manufacturing cells. The cell controller of at least one manufacturing cell of the multiple manufacturing cells is configured to command the welding equipment to use the set of updated welding parameters to counter the degradation to delay having to perform maintenance on the welding equipment. The set of updated welding parameters may include, for example, at least one of a welding voltage, a welding current, an arc travel speed, a wire feed speed, a wire electrode stick out distance, and a welding waveform. In accordance with one embodiment, the system also includes at least one sensor associated with at least one weld of the sequence of welds in each of the multiple manufacturing cells, respectively. The sensor is configured to sense at least one quality parameter associated with generating at least one weld and report at least one quality parameter, directly or indirectly, as the weld data to the respective cell controller. The sensor may include, for example, at least one of a visual spectrum sensor, a radiographic sensor, a laser sensor, an electromagnetic sensor, an infrared sensor, a temperature sensor, a spectrometer sensor, or an ultrasonic sensor, for example. The quality parameter may be related to, for example, at least one of a weld position on the part, a weld bead size, a weld bead shape, weld penetration, weld fusion, weld porosity, weld cracking, weld inclusion, a weld discontinuity, an arc plasma type, or an arc plasma temperature. The component of the welding equipment may include, for example, at least one of a contact tip, a gas nozzle, a wire conduit, a wire liner, an electrical cable, a wire drive roll, a tool fixture, a tool clamp, an air filter, or a robot joint. In one embodiment, the central controller is configured to communicate an identity of at least one weld of the sequence of welds that is experiencing degradation, via the communication network, to the cell controller of at least one manufacturing cell of the multiple manufacturing cells. Furthermore, the cell controller of the manufacturing cell of the multiple manufacturing cells is configured to command a robot of the welding equipment of the manufacturing cell to point to the degraded weld in response to the identity. Alternatively or in addition, the cell controller of at least one manufacturing cell of the multiple manufacturing cells is configured to command that a location of the degraded weld on the part being manufactured be graphically displayed to an operator of the manufacturing cell on a display device of the manufacturing cell in response to the identity.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

FIGS. 6A, 6B, and 6C illustrate embodiments of three types of predictive models;

DETAILED DESCRIPTION

Embodiments of systems and methods for supporting predictive and preventative maintenance are disclosed. For example, trends may be observed across all manufacturing cells (an entire factory/installed base) and trend data can be pushed back to individual manufacturing cells, providing the basis of machine learning with a larger group of machines from which to learn (this is different than just one machine setting limits). Such a larger data set can provide a more predictable learned result.

One embodiment includes manufacturing cells within a manufacturing environment, where each manufacturing cell includes a cell controller and one or more of welding equipment, cutting equipment, and/or additive manufacturing equipment. A communication network supports data communications between a central controller and the cell controller of each of the manufacturing cells. The central controller collects cell data from the cell controller of each of the manufacturing cells, via the communication network. The cell data is related to the operation, performance, and/or servicing of a same component type of each of the manufacturing cells to form a set of aggregated cell data for the component type. The central controller also analyzes the set of aggregated cell data to generate a predictive model related to future maintenance of a component of the component type. The term "maintenance" as used herein refers to the servicing and/or the replacement of a component.

Figure 1:
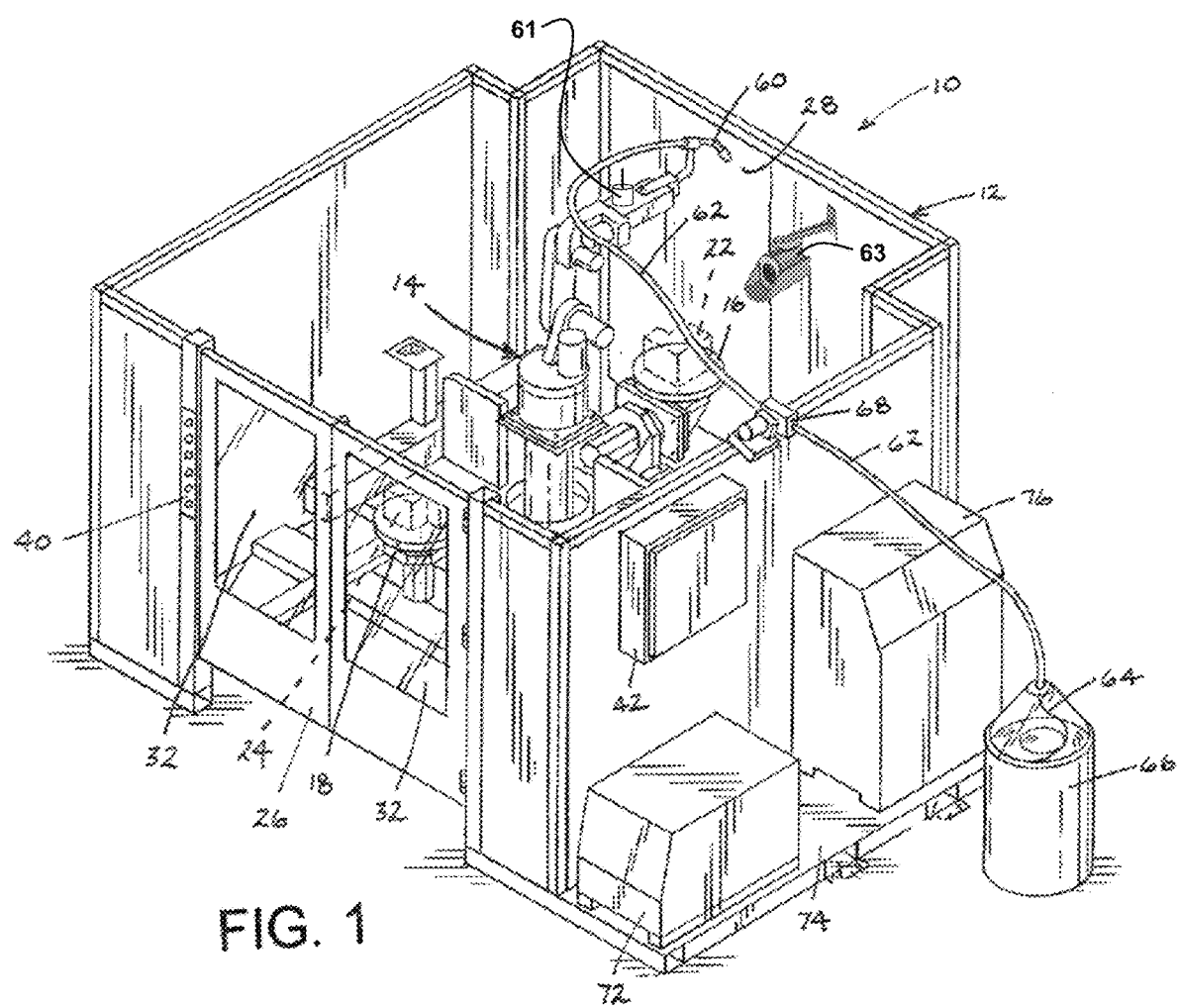
FIG. 1 illustrates one embodiment a manufacturing cell for manufacturing a part within a manufacturing environment.

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 illustrates one embodiment of a manufacturing cell 10 configured with welding equipment for manufacturing a metal part via welding within a manufacturing environment. The manufacturing cell 10 is discussed in detail herein with respect to being configured with welding equipment. However, in other embodiments, the manufacturing cell may be configured with, for example, cutting equipment for cutting metal, or additive manufacturing equipment for additively manufacturing a metal part. It is envisioned that a manufacturing cell may be used to weld or additively manufacture a part b y a process such as, for example, gas metal arc welding (GMAW), flux-cored arc welding (FCAW), or gas tungsten arc welding (GTAW). It is also envisioned that a manufacturing cell may be used for cutting a metal part by a plasma cutting process. Other processes for welding, cutting, or additive manufacturing are possible as well, in accordance with other embodiments.

For example, as is generally known, additive manufacturing is a process in which a material is deposited onto a base/substrate or part (e.g., in layers) so as to create a desired manufactured product. Patterns of multiple layers of a three-dimensional (3D) part to be additively manufactured are represented and stored as digital data, in accordance with one embodiment. The digital data may be from a CAD model or from a scanned part, for example.

Embodiments of additive manufacturing equipment may include, for example, at least one of a laser-based subsystem, a plasma based subsystem, an arc based subsystem, an electron beam based subsystem, or an electric resistance based subsystem to, for example, deposit a metal material by melting a metal wire. Furthermore, some embodiments of additive manufacturing equipment may include, for example, a wire delivery or feeding system to feed/deliver a consumable metal wire to additively manufacture a 3D part on a base. Also, some embodiments of additive manufacturing equipment may include, for example, kinematic control elements (e.g., robotics) or other types of control elements (e.g., optical control elements) to move a laser beam, a plasma beam, an electric arc, an electron beam, or a consumable metal wire with respect to a 3D part being additively manufactured on a base or substrate.

With reference to FIG. 1, the manufacturing cell 10 is a welding manufacturing cell and generally includes a frame 12, a robot 14 disposed within the frame, and first and second welding tables 16 and 18, respectively, also disposed within the frame. The manufacturing cell 10 is useful for welding work pieces (parts) 22 and 24. In the depicted embodiment of FIG. 1, the frame 12 includes a plurality of side walls and doors to enclose the robot 14 and the welding tables 16 and 18. Even though a substantially rectangular configuration in plan view is shown, the frame 12, and the cell 10, can take numerous configurations.

A front access door 26 mounts to the frame 12 to provide access to the interior of the frame. The front access door 26 can take a bi-fold configuration where the door includes two hinge sets: a first hinge set attaching the door 26 to the frame 12 and a second hinge set attaching one panel of the door to another panel. Nevertheless, the front access door 26 can take other configurations such as a sliding door or a swinging door. Similarly, a rear access door 28 also mounts to the frame 12. The rear access door 28 in the depicted embodiment also takes a bi-fold configuration; however, the rear access door can take other configurations such as those discussed with reference to the front access door 26. Windows 32 can be provided on either door (only depicted on front door 26). The windows can include a tinted safety screen, for example.

A control panel 40 is provided on the frame 12 adjacent the front door 26. Control knobs and/or switches provided on the control panel 40 communicate with controls housed in a controls enclosure 42 that is also mounted to the frame 12. The controls on the control panel 40 can be used to control operations performed in the manufacturing cell 10 in a similar manner to controls used with known manufacturing cells.

In one embodiment, the robot 14 mounts on a pedestal that mounts on a support. The robot 14 in the depicted embodiment is centered with respect to the welding tables 16 and 18 and includes multiple axes of movement. If desired, the pedestal can rotate with respect to the support similar to a turret. Accordingly, some sort of drive mechanism, e.g. a motor and transmission (not shown), can be housed in the pedestal and/or the support for rotating the robot 14.

In one embodiment, a welding gun 60 attaches to a distal end of an arm of the robot 14. The welding gun 60 can be similar to those that are known in the art. A flexible tube or conduit 62 attaches to the welding gun 60. Consumable welding electrode wire 64, which can be stored in a container 66, is delivered to the welding gun 60 through the conduit 62. A wire feeder 68 attaches to the frame 12 to facilitate the delivery of consumable welding wire 64 to the welding gun 60. Even though the robot 14 is shown mounted to a base or lower portion of the frame 12, if desired, the robot 14 can mount to an upper structure of the frame and depend downwardly into the manufacturing cell 10. In one embodiment, a power source 72 for the welding operation mounts to and rests on a platform 74 that is connected to and can be a part of the frame 12.

In the embodiment of FIG. 1, a sensor 61 is mounted on an arm of the robot 14 near a joint of the robot 14. For example, in accordance with one embodiment, the sensor 61 is a vibration sensor configured to sense vibrations at the joint (a component) of the robot 14. In other embodiments, the sensor 61 may be a different type of sensor mounted elsewhere within the manufacturing cell 10. For example, the sensor 61 may be a camera for sensing wear of a component, a flow sensor for sensing air flow or gas flow through a component, a user interface allowing an operator to enter a time when maintenance/replacement was performed on a component, a counter (time sensor) keeping track of the operational time of a component, a sound sensor for sensing a sound produced by a component, or a current sensor or a voltage sensor for sensing current and voltage of a component (e.g., an electrical cable; the sensed current and voltage may be used, for example, to calculate a resistance and/or an inductance of the electrical cable). In accordance with other embodiments, multiple sensors can be employed throughout the manufacturing cell to sense parameters associated with components. Such sensing can be accomplished during welding and/or after welding, in accordance with various embodiments. Sensor fusion or data fusion techniques may be employed, in accordance with some embodiments, to combine data from two or more sensors to generate cell data associated with a component.

Furthermore, in one embodiment, a feedback mechanism (e.g., a user interface) is provided for an operator to easily provide the condition of a replaceable component, providing a method for collecting operator input with respect to the status of components. The system is configured to take the operator inputs (as cell data) from across the installed base and use, for example, machine learning to train models to predict when components will need to be replaced or serviced.

In FIG. 1, another sensor 63 is mounted near a workpiece 22 to observe a quality parameter of welds created on the workpiece 22. In accordance with one embodiment, the sensor 63 is configured to observe welds created on the workpiece 22. For example, the sensor 63 may be a visual spectrum sensor (e.g., a camera), a radiographic sensor, a laser sensor, an electromagnetic sensor, an infrared sensor, a temperature sensor, a spectrometer sensor, or an ultrasonic sensor. The quality parameter may be related to, for example, a weld position on the workpiece/part 22, a weld bead size, weld penetration, weld fusion, weld porosity, weld cracking, weld inclusion, a weld discontinuity, an arc plasma type, or an arc plasma temperature. Such sensing can be accomplished during welding and/or after welding, in accordance with various embodiments. Sensor fusion or data fusion techniques may be employed, in accordance with some embodiments, to combine data from two or more sensors to generate weld data associated with a weld.

A cell controller 76 communicates with and controls various portions of the welding equipment of the manufacturing cell 10 (including the robot 14), and rests and mounts on the platform 74. For example, the cell controller 76 can communicate with the controls enclosure 42 and the power source 72, in accordance with one embodiment. The cell controller 76 is also configured to communicate with an external central controller, as discussed later herein. In an alternative embodiment, the robot 14 is not part of the manufacturing cell 10. Instead, the manufacturing cell is a semi-automatic manufacturing cell that feeds wire to a welding gun held and operated by a human user to generate welds on a workpiece/part. In one embodiment, a cell controller and, for example, a welding power source controller may communicate with each other (exchange data that can be used to predict when maintenance is needed). As a result, machine learning can be provided over a broader group of machines. The cell controller may gather data from many different devices (robot, power supply, tooling, sensors, etc.) of the manufacturing cell and enable the bundling of service.

Figure 2:
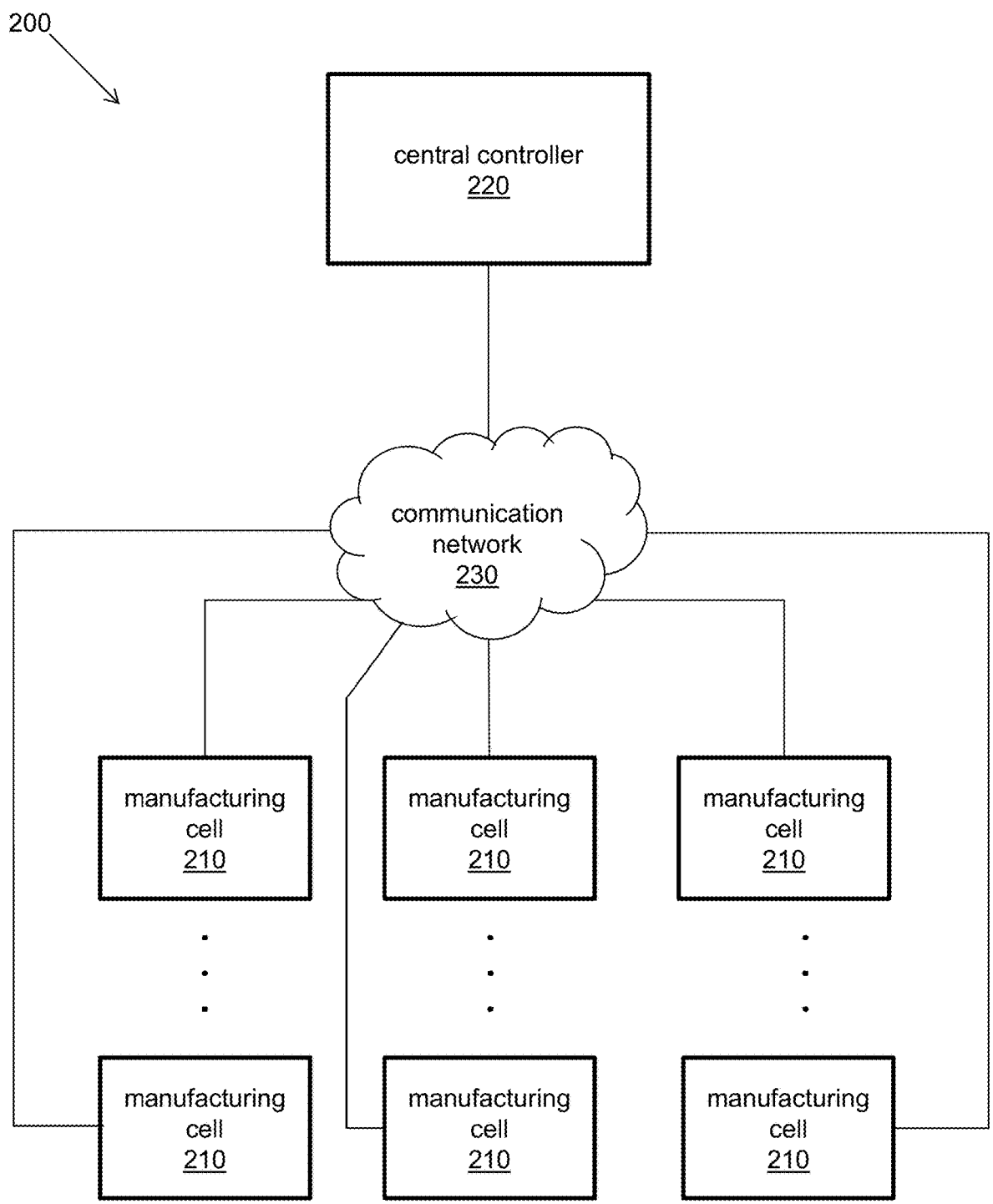
FIG. 2 illustrates one embodiment of a system supporting predictive and preventative maintenance having a plurality of manufacturing cells within a manufacturing environment that are in wired communication with a central controller via a communication network.

FIG. 2 illustrates one embodiment of a system 200 supporting predictive and preventative maintenance and having a plurality of manufacturing cells 210 within a manufacturing environment that are in communication with a central controller 220 via a communication network 230. For example, each of the manufacturing cells 210 may be similar to the manufacturing cell 10 of FIG. 1 supporting welding equipment and having a cell controller (e.g., similar to cell controller 76 of FIG. 1). In other embodiments, the manufacturing cell 210 may be configured to support cutting equipment or additive manufacturing equipment. In the embodiment of FIG. 2, communication between the manufacturing cells 210 and the central controller 220 via the communication network 230 is accomplished via wired communications (e.g., copper wire or fiber optics). In one embodiment, the manufacturing cells 210 are robotic manufacturing cells. In another embodiment, the manufacturing cells 210 are semi-automatic manufacturing cells that feed a consumable wire to a welding gun held and operated by a human user to generate welds on a workpiece/part.

Figure 3:
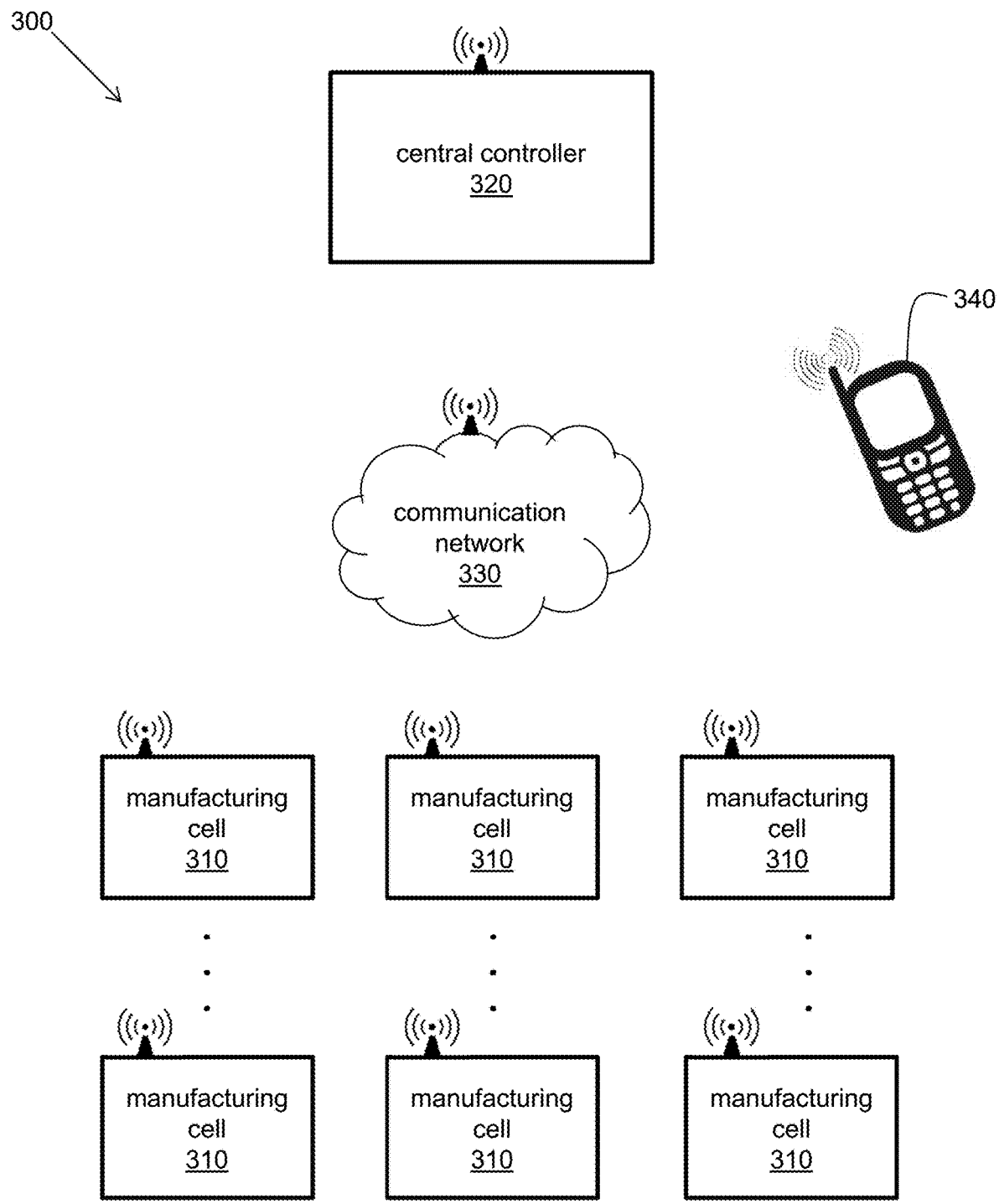
FIG. 3 illustrates one embodiment of a system supporting predictive and preventative maintenance having a plurality of manufacturing cells within a manufacturing environment that are in wireless communication with a central controller via a communication network.

Similarly, FIG. 3 illustrates one embodiment of a system 300 supporting predictive and preventative maintenance and having a plurality of manufacturing cells 310 within a manufacturing environment that are in wireless communication with a central controller 320 via a wireless communication network 330. The system 300 also includes a mobile device 340 (e.g., a smart phone of a maintenance person or manager) configured to wirelessly communicate with the central controller 320 via the wireless communication network 330, for example, to receive messages via the wireless communication network 330 indicating when a component should be serviced or replaced. Embodiments of systems having combinations of wired and wireless communications are also possible as well. In one embodiment, the manufacturing cells 310 are robotic manufacturing cells. In another embodiment, the manufacturing cells 310 are semi-automatic manufacturing cells that feed a consumable wire to a welding gun held and operated by a human user to generate welds on a workpiece/part.

Referring again to FIG. 2 and FIG. 3, in accordance with one embodiment, each manufacturing cell 210 (or 310) includes a cell controller (e.g., similar to the cell controller 76 of FIG. 1). Each cell controller and the central controller 220 (or 320) may share one or more characteristics with the controller 1200 of FIG. 12 (discussed later herein). The communication network 230 (or 330) may be configured as, for example, a local area network, a wide area network, the internet, or some combination thereof and may include, for example, a server computer, a network storage device, a wireless router, a modem, or some combination thereof, in accordance with various embodiments. The cell controller of each manufacturing cell 210 (or 310) is configured to communicate with the central controller 220 (or 320) via the communication network 230 (or 330).

In a simple (minimal) embodiment, the communication network 230 may be configured as, for example, digital communication cables (e.g., copper or fiber optic) connected between digital communication circuits at the central controller 220 and the manufacturing cells 210. The digital communication circuits are configured to send and receive digital data between the central controller 220 and the manufacturing cells 210 over the digital communication cables. Also, in a simple (minimal) embodiment, the wireless communication network 330 may be configured as, for example, radio frequency antennas connected to wireless digital communication circuits at the central controller 320 and the manufacturing cells 310. The wireless digital communication circuits are configured to transmit and receive radio frequency signals encoded with digital data between the central controller 320 and the manufacturing cells 310 via the antennas.

Therefore, in accordance with various embodiments, the communication network 230 (and 330) may have elements located away from the central controller 220 (and 320) and the manufacturing cells 210 (and 310) and/or at the central controller 220 (and 320) and the manufacturing cells 210 (and 310).

A cell controller (e.g., cell controller 76 of FIG. 1) of a manufacturing cell acts as a communication hub for the manufacturing cell, and can gather all of the cell data and bundle maintenance items into batch services, for example, for that manufacturing cell. The system as a whole may also send emails or texts for maintenance as well as sending a note of what needs to be maintained so a maintenance person can bring the correct materials for servicing components of a manufacturing cell. In one embodiment, materials can be ordered and delivered with a note saying, for example, "Cell 919 needs these components replaced in 3 days".

The central controller 220 (or 320) collects cell data from the manufacturing cells 210 (or 310) across the manufacturing environment over time, where the cell data is related to the operation, performance, and/or servicing of components of the manufacturing cells 210 (or 310). For each component type (e.g., a gas nozzle) for which cell data is collected, a set of aggregated cell data for that component type is generated. The central controller 220 (or 230) analyzes (e.g., trains on) the set of aggregated cell data and generates a predictive model (PM) related to future maintenance of the component type. A predictive model generated by a central controller is in the form of a set of computer-executable instructions and/or data stored in a memory and capable of being executed by a processor, in accordance with one embodiment. A predictive model may be updated by a central controller over time, for example, as additional cell data is collected. A set of aggregated cell data may be updated over time to discard certain cell data (e.g., discard older cell data), add certain cell data (e.g., add newer cell data), or weight certain cell data (e.g., weight newer cell data more strongly than older cell data). Again, a predictive model is generated based on a set of aggregated cell data that is formed from cell data collected across a manufacturing environment from multiple manufacturing cells.

Figure 4:
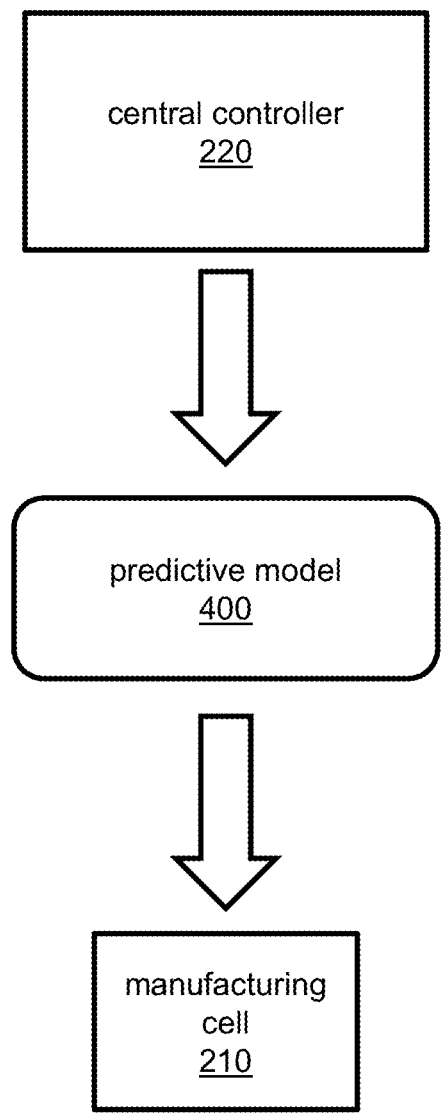
FIG. 4 illustrates one embodiment of a central controller communicating a predictive model to a manufacturing cell.

FIG. 4 illustrates one embodiment of a central controller 220 communicating a predictive model 400 for a component type (e.g., a contact tip) to a manufacturing cell 210. In accordance with one embodiment, the cell controller of the manufacturing cell is configured to feed input data (unique to the component of that component type for that manufacturing cell 210) into the predictive model 400 and execute the predictive model 400 to determine when that component (e.g., a gas nozzle) for that manufacturing cell 210 is to be serviced or replaced. The central controller 220 can similarly communicate the predictive model 400 to each of the manufacturing cells within the manufacturing environment such that each cell controller of each manufacturing cell can execute the predictive model 400 in a similar manner. A different predictive model can be generated by the central controller for each different component type within a manufacturing cell.

Figure 5:
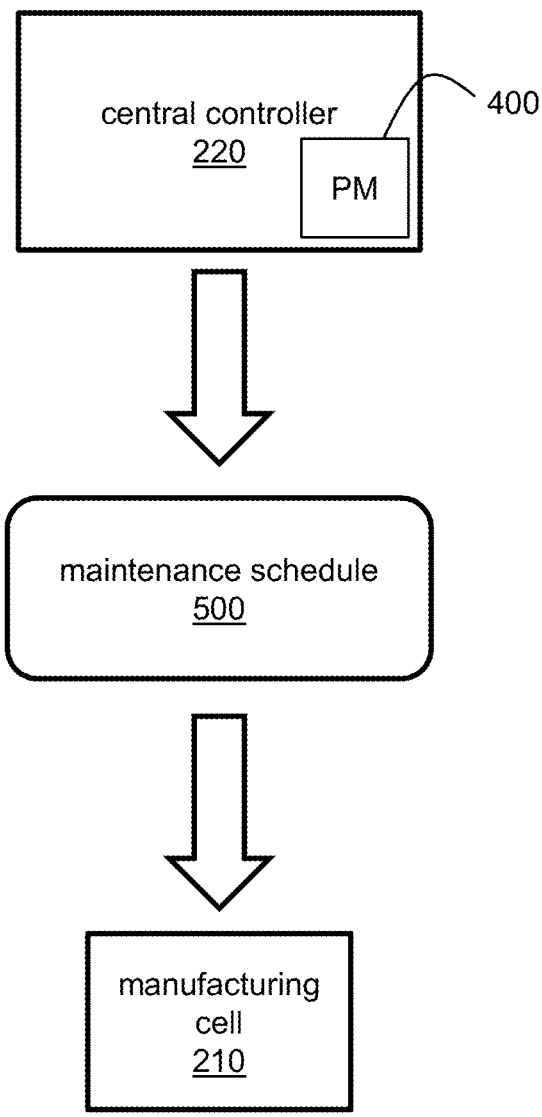
FIG. 5 illustrates one embodiment of a central controller communicating a maintenance schedule to a manufacturing cell.

Alternatively, FIG. 5 illustrates one embodiment of a central controller 220 communicating a maintenance schedule (MS) 500 to a manufacturing cell 210. The central controller 220 is configured to feed input data (unique to the component of that component type for that manufacturing cell 210) into the predictive model 400 and execute the predictive model 400 to determine when that component (e.g., a gas nozzle) for that manufacturing cell 210 is to be serviced or replaced and to generate a corresponding maintenance schedule 500. As shown in FIG. 5, the maintenance schedule 500 is reported to the cell controller of that manufacturing cell 210 such that the cell controller is aware of when that component is to be serviced or replaced for that manufacturing cell 210. The central controller 220 can similarly generate and communicate a different maintenance schedule to each of the manufacturing cells within the manufacturing environment such that each cell controller of each manufacturing cell is aware of when that component type is to be serviced or replaced for that manufacturing cell 210. Different predictive models and different maintenance schedules can be generated by the central controller for each different component type within a manufacturing cell.

FIGS. 6A, 6B, and 6C illustrate embodiments of three types of predictive models. The first type of predictive model 610 is an algorithm. The second type of predictive model 620 is an equation. The third type of predictive model 630 is a trend represented by, for example, trend data (represented in FIG. 6C as a graph). Other types of predictive models may be possible as well, in accordance with other embodiments. In accordance with one embodiment, the central controller 220 (or 320) is configured with machine learning technology and uses machine learning technology to analyze the collected cell data and generate a predictive model.

In accordance with various embodiments, the machine learning employed by the central controller 220 (or 320) may include, for example, a supervised learning approach, an unsupervised learning approach, or a reinforcement learning approach to train or generate a predictive model. Learning approaches may include, for example, one or more of a linear regression technique, a logistic regression technique, a decision tree technique, a K-Nearest Neighbor technique, a K-means technique, an evolutionary algorithm technique (e.g., a genetic algorithm technique), a Gradient Boosting technique, or an AdaBoost technique. Other learning approaches are possible as well, in accordance with other embodiments. In accordance with various embodiments, the central controller 220 (or 320) may employ a support vector machine, a tensor processing unit, a graphics processing unit, an artificial neural network, a Bayesian network, or a learning classifier system, for example, to support one or more of the learning approaches.

It is noted here that a specific predictive model is not being disclosed or claimed herein. The specifics of any predictive model generated by the central controller 220 (or 320) will depend on the specific collected cell data and the specific type of analysis being performed (e.g. the specific type of machine learning being employed) on the specific collected cell data. Therefore, it is not intended nor is there any need to disclose a specific predictive model herein. One skilled in the art will recognize that different embodiments of the present invention implemented in different manufacturing environments will generate different predictive models, and that a predictive model can be updated and changed over time based on new cell data and/or other changing conditions within a manufacturing environment.

Figure 7:
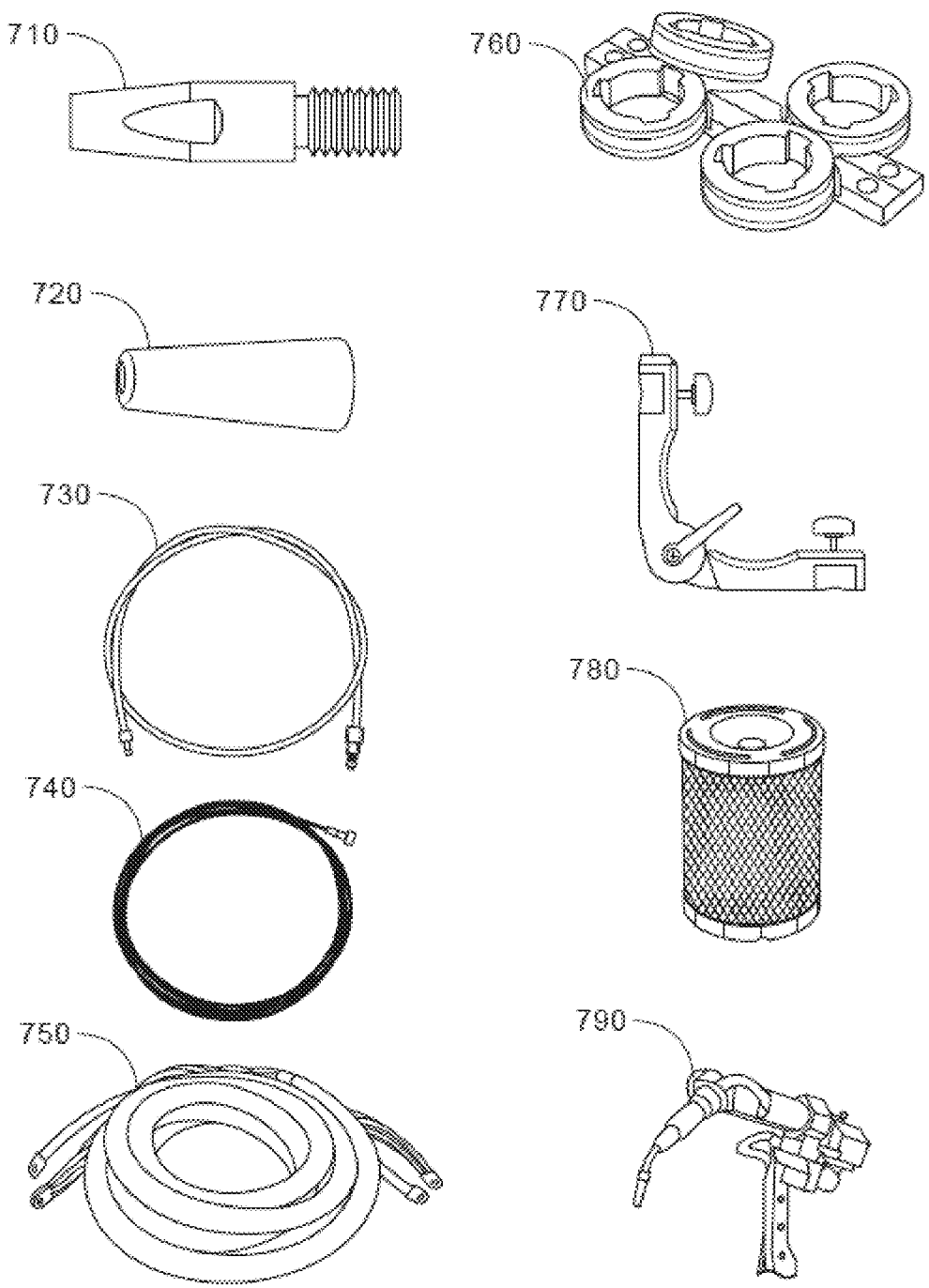
FIG. 7 illustrates example embodiments of components of equipment within manufacturing cells of a manufacturing environment.

FIG. 7 illustrates example embodiments of components of equipment within manufacturing cells of a manufacturing environment. The components shown in FIG. 7 include a contact tip 710, a gas nozzle 720, a wire conduit 730, a wire liner 740, an electrical cable 750, a wire drive roll assembly 760, a tool fixture or clamp 770, an air filter 780, and a robot joint 790. Some components are of the type that are serviced and/or replaced more frequently than certain other types of components. Other types of components are possible as well. One skilled in the art would recognize how such components may be used within welding equipment, cutting equipment, or additive manufacturing equipment within a manufacturing cell.

Figure 8:
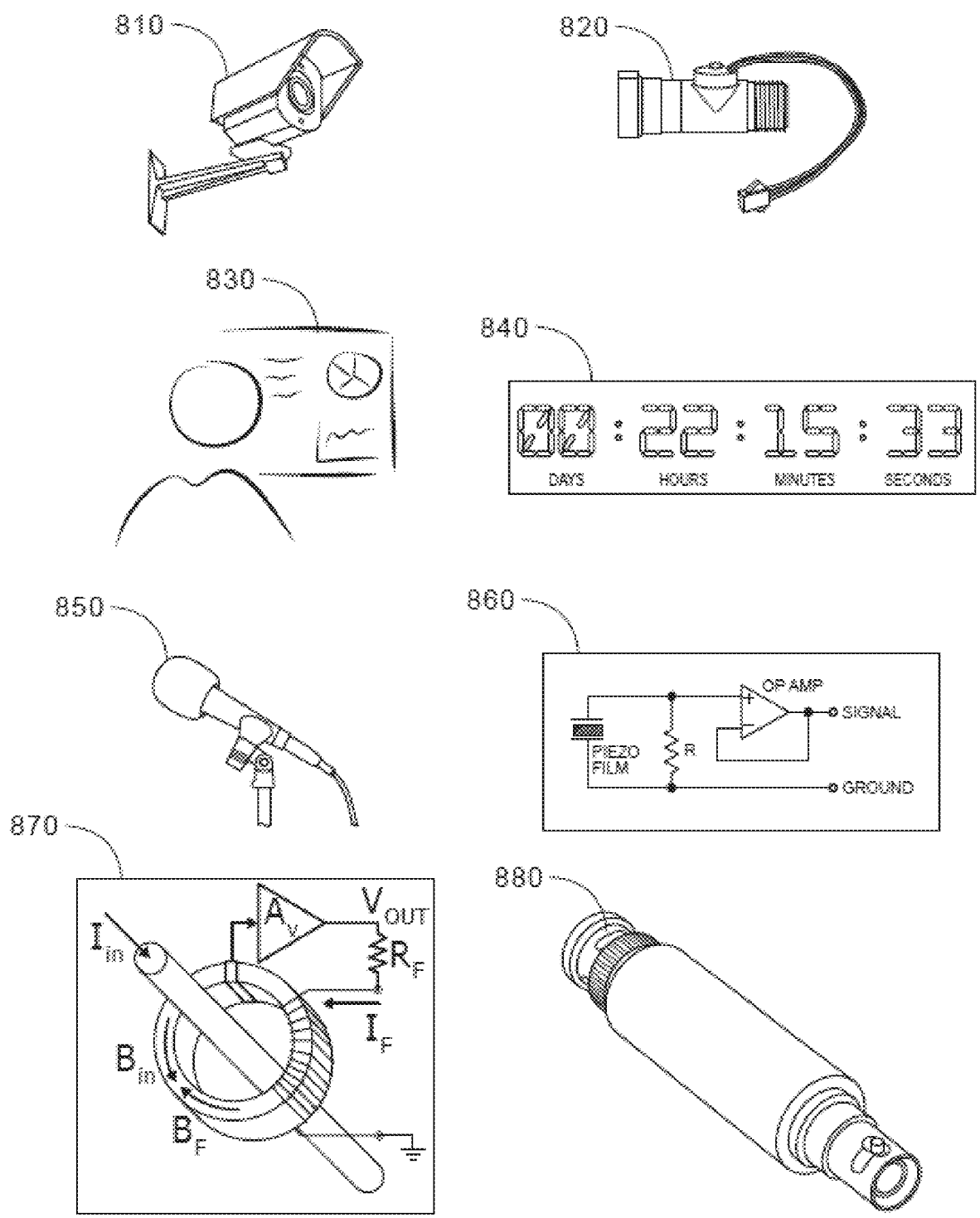
FIG. 8 illustrates example embodiments of sensors associated with components of equipment within manufacturing cells of a manufacturing environment.

FIG. 8 illustrates example embodiments of sensors associated with components of equipment within manufacturing cells of a manufacturing environment (e.g., sensor 61 of FIG. 1). The sensors shown in FIG. 8 are associated with the components (e.g., the components of FIG. 7) in the manufacturing cells. The sensors are configured to sense parameters associated with the operation, the performance, or the servicing of the components and report the parameters, directly or indirectly (e.g., indirectly via a controller of a welding power source), to the respective cell controller of the respective manufacturing cell as cell data. The cell data from each manufacturing cell is communicated to the central controller (e.g., the central controller 220 or 320) to aggregate the cell data, per component type, and generate a predictive model per component type. Such sensing can be accomplished during welding and/or after welding, in accordance with various embodiments. Sensor fusion or data fusion techniques may be employed, in accordance with some embodiments, to combine data from two or more sensors to generate cell data associated with a component.

As shown in FIG. 8, a sensor may be a visual spectrum sensor or an infrared spectrum sensor (e.g., a camera 810) for sensing wear of a component (e.g., a contact tip 710). A sensor may be a flow sensor 820 for sensing air flow or gas flow through or over a component (e.g., a gas nozzle 720). A sensor may be a user interface 830 allowing an operator to enter, for example, operational and/or maintenance information (e.g., a time when servicing or replacement of a component (e.g., an air filter 780) was performed). A sensor may be a counter (a time sensor) 840 for keeping track of an operational time of a component (e.g., a robot joint 790). A sensor may be a sound sensor (e.g., a microphone) 850 for sensing sound produced by a component (e.g., a wire drive roll assembly 760). A sensor may be a vibration sensor 860 for sensing a magnitude and/or a frequency of a vibration experienced, or produced by, a component (e.g., a tool fixture or clamp 770). A sensor may be a current sensor 870 for sensing a current through, or produced by, a component (e.g., an electrical cable 750). A sensor may be a voltage sensor 880 for sensing a voltage at or produced by a component (e.g., an electrical cable 750). For example, in accordance with one embodiment, sensed current and voltage can be used to calculate the resistance and/or the inductance of an electrical cable (a component). Other types of sensors for sensing other types of parameters associated with the operation, the performance, or the servicing of components are possible as well, in accordance with other embodiments. For example, sensors that generate parameters indicating the failure or the percent degradation of components may also be captured and reported as cell data.

As an example, miscellaneous variables collected as cell data from the multiple manufacturing cells (such as wire type & size, wire packaging type, average wire feed speed, and type of liners used) can be collectively used to predict liner wear and to determine a corresponding maintenance schedule to replace the liners before a failure occurs. Also, torch wire feeder motor torque per robot program weld number over time and torch twisting at different welds affects wire feeder motor torque. By monitoring such variables and parameters, an operator can be alerted to change the liner at a predicted time.

As another example, contact tip wear is influenced by variables such as the type of welding operations, welding position, type & size of wire, average amperage, wire feed speed, number of arc starts, and duration of welding operations (overall temperature of the contact tip). Using these interrelated variables as cell data, a predictive model can be created for contact life and replacement schedules based on the specific use cases. Contact tip replacements can then be organized to minimize waste (replacing too early) and maximize productivity (avoiding failures from replacing too late). Such variables can be tracked per robot program weld number (different weld data used at different welds), in accordance with one embodiment.

As a further example, as a gas nozzle loads up with spatter, gas flow will change, which changes the arc characteristics (deterioration of the arc). Spatter build up is influenced by the type of welding operations, welding position, wire type & size, shielding gas, wire feed speed, number of arc starts, and duration of welding operations. A predictive replacement schedule can be created using these parameters which helps avoid welding defects by replacing the gas nozzle before a gas flow restriction causes welding defects. Such variables can be tracked per robot program weld number to account for effects of torch twisting, for example, in accordance with one embodiment.

As still another example with respect to dirty air filters, operating data can provide information on overall production levels which can be associated with the amount of particulate in the environment. The amount of particulate in the environment can be used to determine the time period between required filter replacements. This could be a filter for the power supply or this could be a filter for a fume control system, for example.

Figure 9:
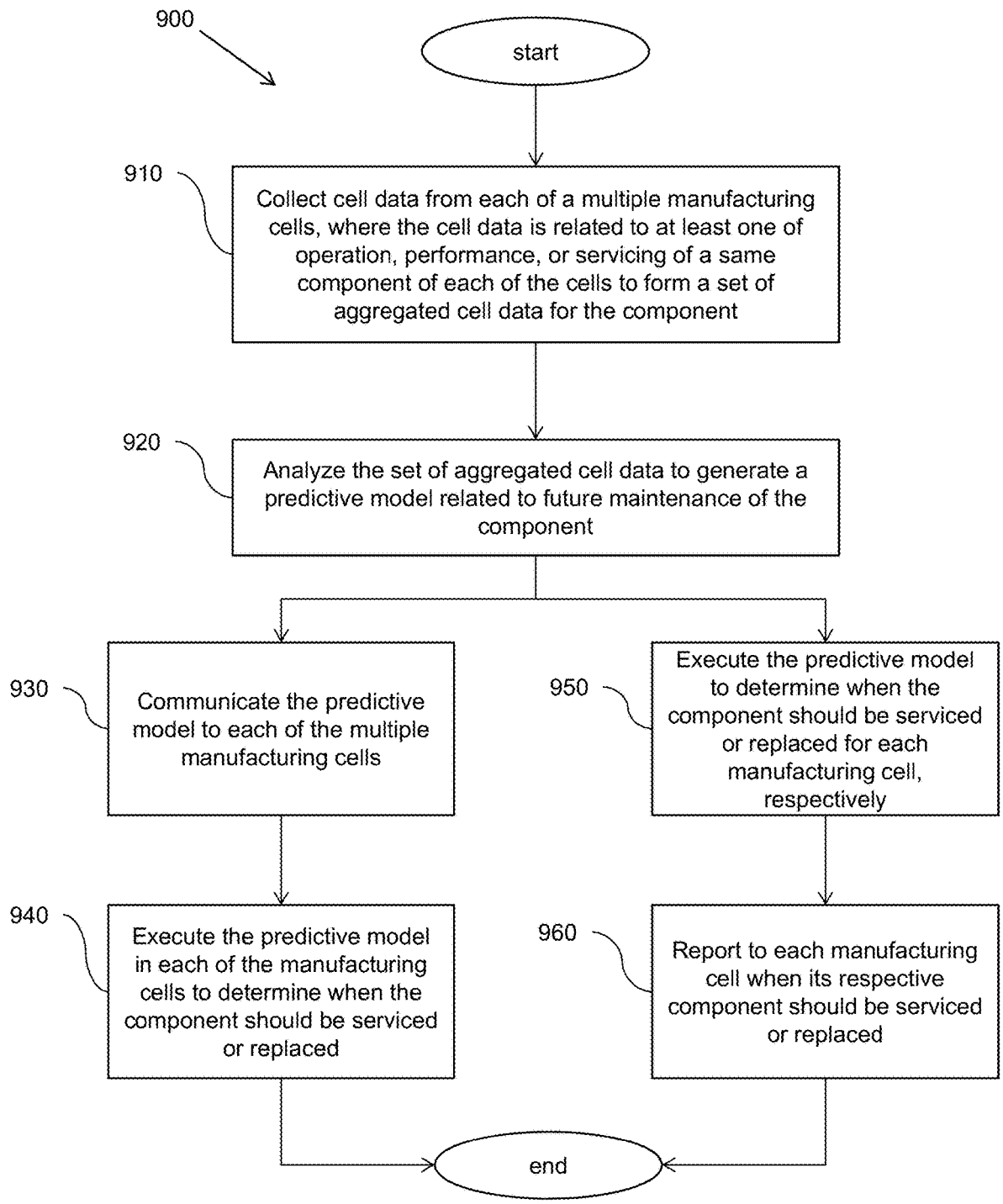
FIG. 9 illustrates a flow chart of one embodiment of a method to support predictive and preventative maintenance within a manufacturing environment.

FIG. 9 illustrates a flow chart of one embodiment of a method 900 to support predictive and preventative maintenance within a manufacturing environment. The method 900 includes, at block 910, collecting cell data from multiple manufacturing cells within a manufacturing environment (e.g., collecting the cell data within a central controller). The cell data is related to at least one of operation, performance, or servicing of a same type of component of each of the manufacturing cells and forms a set of aggregated cell data for a component type (e.g., a wire drive roll assembly). At block 920, the set of aggregated cell data is analyzed (e.g., by the central controller applying a machine learning technique) to generate a predictive model related to future maintenance of the component type.

At block 930, the predictive model is communicated (e.g., from the central controller) to each of the multiple manufacturing cells. At bock 940, the predictive model is executed in each of the manufacturing cells (e.g., by a cell controller) to determine when the component of that component type within each respective manufacturing cell should be serviced or replaced.

As an alternative to blocks 930 and 940, at block 950, the predictive model is executed (e.g., by the central controller) to determine when the component of that component type within each respective manufacturing cell should be serviced or replaced. That is, the predictive module is executed multiple times (e.g., by the central controller), once for each manufacturing cell. At block 960, a report is sent to each manufacturing cell (e.g., in the form of a maintenance schedule for each manufacturing cell) indicating when its respective component of the component type should be serviced or replaced.

Therefore, depending on the system configuration, the predictive model may be executed by each manufacturing cell (e.g., by a cell controller of each manufacturing cell) or the predictive model may be executed external to the manufacturing cells (e.g., by a central controller of the system).

In accordance with one embodiment, a feedback mechanism can be provided on a manufacturing cell to provide feedback data as cell data to help teach the predictive models. Feedback data (e.g., good, bad, or ugly, or a sliding scale) can be provided based on the amount of damage suffered by a particular component. For example, a manufacturing cell that is configured to provide a 0-5 scale on how bad a particular component is can be used to train the system to predict when maintenance will be needed on that type of component across the installed base. In addition, the feedback mechanism can also include the ability to collect data on outlier events that do not directly relate to a predictive model (e.g., operator error that damages a contact tip and requires replacement; the replacement of that contact tip, and the data associated with it, would not be utilized in the creation of a predictive model for determining contact tip life).

Figure 10:
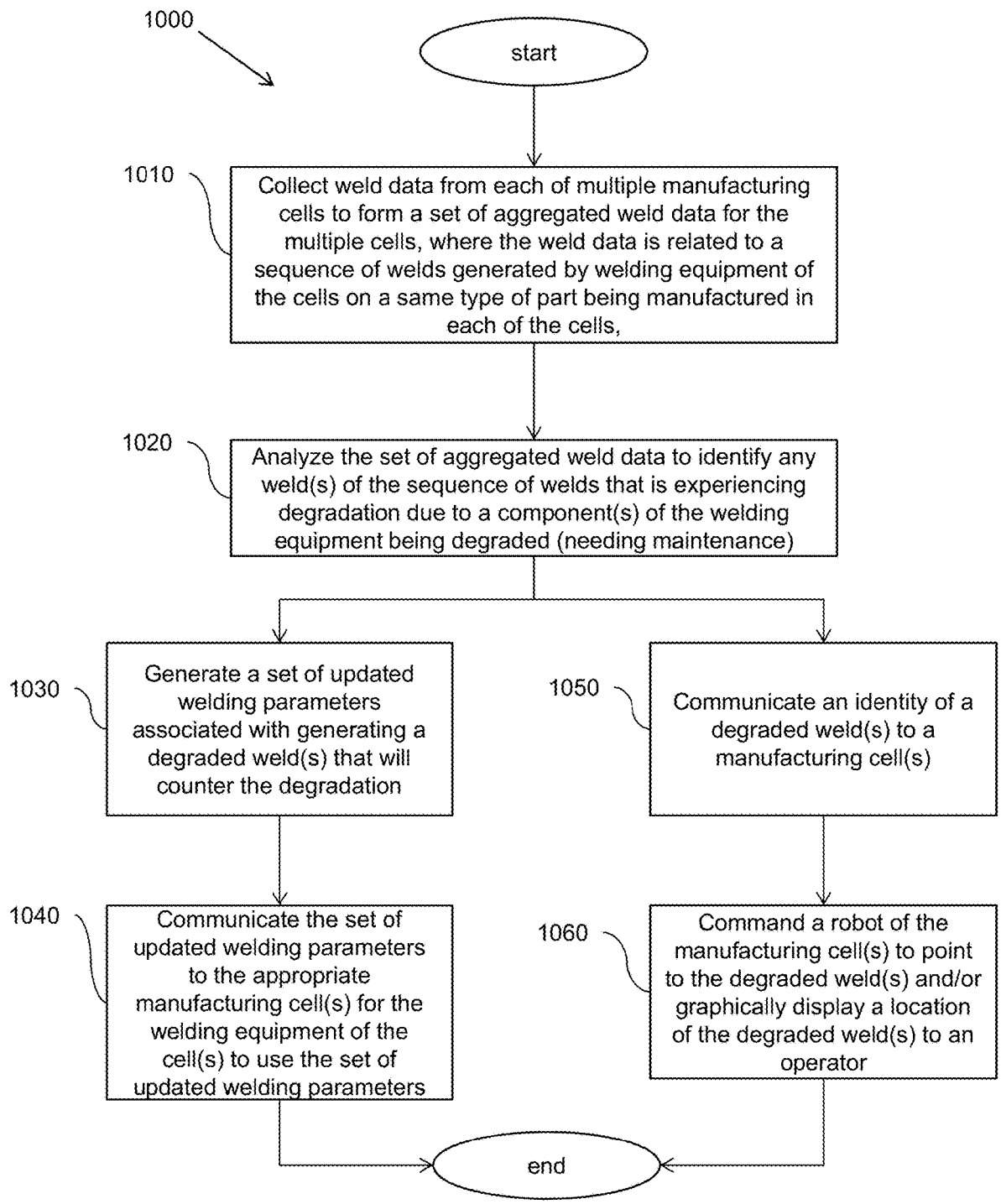
FIG. 10 illustrates a flow chart of one embodiment of a method allowing maintenance to be delayed within a manufacturing environment.

FIG. 10 illustrates a flow chart of one embodiment of a method 1000 allowing maintenance to be delayed within a manufacturing environment. The method 1000 includes, at block 1010, collecting weld data from each of multiple manufacturing cells across a manufacturing environment to form a set of aggregated weld data for the multiple manufacturing cells (e.g., collecting the weld data within a central controller). The weld data is related to a sequence of welds generated by welding equipment of the manufacturing cells on a same type of part being manufactured in each of the manufacturing cells. For example, the weld data may include data captured by sensors that is related to a weld position on the workpiece/part, a weld bead size, weld penetration, weld fusion, weld porosity, weld cracking, weld inclusion, a weld discontinuity, an arc plasma type, or an arc plasma temperature. Other types of weld data are possible as well, in accordance with other embodiments.

At block 1020, the set of aggregated weld data is analyzed to identify any weld(s) of the sequence of welds that is experiencing degradation, for example, due to a degraded component(s) of the welding equipment (i.e., due to a component(s) needing maintenance). For example, in accordance with one embodiment, the central controller (e.g., central controller 220 or 320) applies a model (e.g., a model previously generated via a machine learning technique) to the set of aggregated weld data to identify any weld(s) of the sequence of welds that is experiencing degradation. Other types of analysis are possible as well, in accordance with other embodiments. A degraded component of the welding equipment may include, for example, a contact tip, a gas nozzle, a wire conduit, a wire liner, an electrical cable, a wire drive roll, a tool fixture, a tool clamp, an air filter, or a robot joint. Other types of degraded components are possible as well, in accordance with other embodiments.

In many instances, it may be assumed that the degradation of a weld is due to a component being degraded and, therefore, in need of maintenance (as opposed to being due, for example, to a bad process) since weld data from across the multiple manufacturing cells is being collected and analyzed. For example, if a weld is of good quality on most of the manufacturing cells, but of degraded quality on one or a few of the manufacturing cells, then it may be assumed that the process (which is the same process being used across the multiple manufacturing cells on the same type of part) is not the cause of the weld degradation. However, if degradation of a weld(s) is seen across all (or almost all) of the manufacturing cells, then this may be an indication that the process may indeed be bad (or may have somehow gone bad).

At block 1030, a set of updated welding parameters are generated (e.g., by a central controller 220 or 320) which is associated with generating the identified weld(s) determined to be degraded. The intent of the updated welding parameters is to counter the degradation of the identified weld(s). In accordance with one embodiment, the central controller is configured to generate the set of updated welding parameters based on the nature of the degradation of the weld(s) (e.g., an incorrect weld position on the workpiece/part, an unacceptable weld bead size, inadequate weld penetration, inadequate weld fusion, weld porosity, weld cracking, weld inclusion, a weld discontinuity, an undesired arc plasma type, or a low arc plasma temperature). The set of updated weld parameters may include at least one of a welding voltage, a welding current, an arc travel speed, a wire feed speed, a wire electrode stick out distance, and a welding waveform, for example. Other weld parameters are possible as well, in accordance with other embodiments.

At block 1040, the set of updated welding parameters is communicated to the appropriate manufacturing cell(s) (e.g., communicated from the central controller 220 or 320 to a cell controller(s) of the appropriate manufacturing cell(s) 210 or 310 over the communication network 230 or 330). The welding equipment of the manufacturing cell(s) receiving the set of updated welding parameters are commanded (e.g., by the cell controller of the appropriate manufacturing cell(s)) to use the set of updated welding parameters to counter the degradation of the identified weld(s). This results in being able to delay having to perform maintenance on one or more components of the welding equipment, assuming the set of updated welding parameters eliminate the degradation of the weld(s).

At block 1050, an identity of a degraded weld(s) is communicated to the appropriate manufacturing cell(s). For example, the identity of the degraded weld(s) is communicated by the central controller 220 or 320 to the cell controller(s) of the appropriate manufacturing cell(s) 210 or 310 over the communication network 230 or 330. In accordance with one embodiment, the multiple manufacturing cells are robotic manufacturing cells. In accordance with another embodiment, the multiple manufacturing cells are semi-automatic manufacturing cells that feed wire to a welding gun held and operated by a human user to generate welds on a workpiece/part.

At block 1060, a robot of the manufacturing cell(s) is commanded (e.g., commanded by the cell controller(s) of the manufacturing cell(s)) to point to the degraded weld(s). Alternatively, or in addition, a location of the degraded weld(s) is commanded to be graphically displayed to an operator. For example, the cell controller(s) of the manufacturing cell(s) is configured to command the location of the degraded weld(s) to be graphically displayed on a display device of the manufacturing cell(s). Also, in accordance with one embodiment, a welding sequencer operation of the manufacturing cell can revert to the weld sequence step corresponding to the degraded weld and display work instructions associated with that step to an operator.

Figure 11:
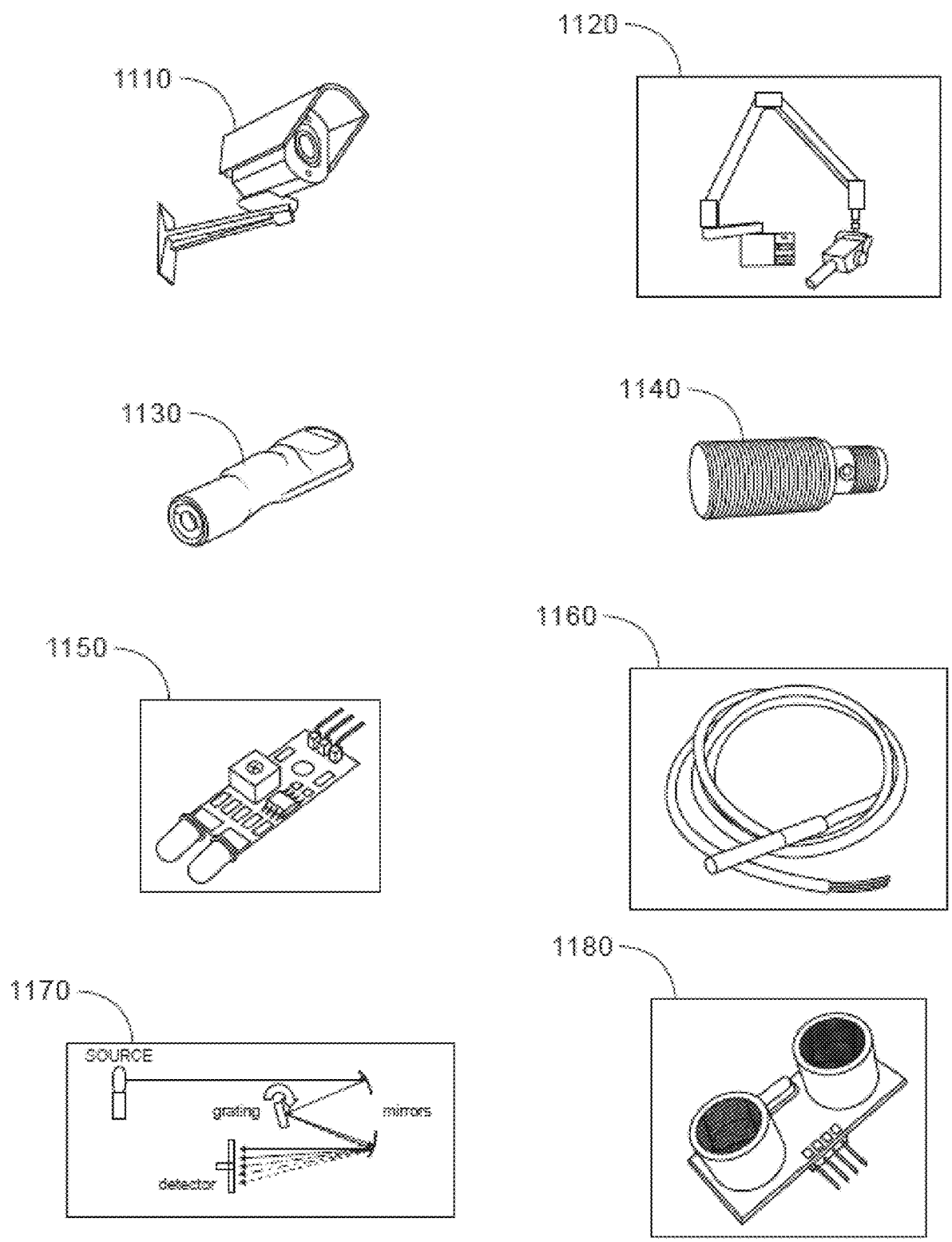
FIG. 11 illustrates example embodiments of sensors associated with welds of a sequence of welds that are performed to manufacture parts within manufacturing cells of a manufacturing environment.

FIG. 11 illustrates example embodiments of sensors associated with welds of a sequence of welds that are performed to manufacture parts within manufacturing cells of a manufacturing environment (e.g., sensor 63 of FIG. 1). Sensors of the types in FIG. 8 are configured to sense quality parameters associated with generating welds of a weld sequence (i.e., the sensors are configured to observe welds created on the parts) and report the quality parameters, directly or indirectly, as weld data to the respective cell controllers of the respective manufacturing cells. A quality parameter can be an indication of the nature of a degraded weld (e.g., poor weld penetration).

For example, a sensor for sensing a quality parameter of a weld may be a visual spectrum sensor (e.g., a camera) 1110, a radiographic sensor 1120, a laser sensor 1130, an electromagnetic sensor 1140, an infrared sensor 1150, a temperature sensor 1160, a spectrometer sensor 1170, or an ultrasonic sensor 1180. Other types of sensors are possible as well, in accordance with other embodiments. A quality parameter may be related to, for example, a weld position on the workpiece/part, a weld bead size, weld penetration, weld fusion, weld porosity, weld cracking, weld inclusion, a weld discontinuity, an arc plasma type, or an arc plasma temperature. Other quality parameters are possible as well, in accordance with other embodiments. Such sensing can be accomplished during welding and/or after welding, in accordance with various embodiments. Sensor fusion or data fusion techniques may be employed, in accordance with some embodiments, to combine data from two or more sensors to generate weld data associated with a weld.

Figure 12:
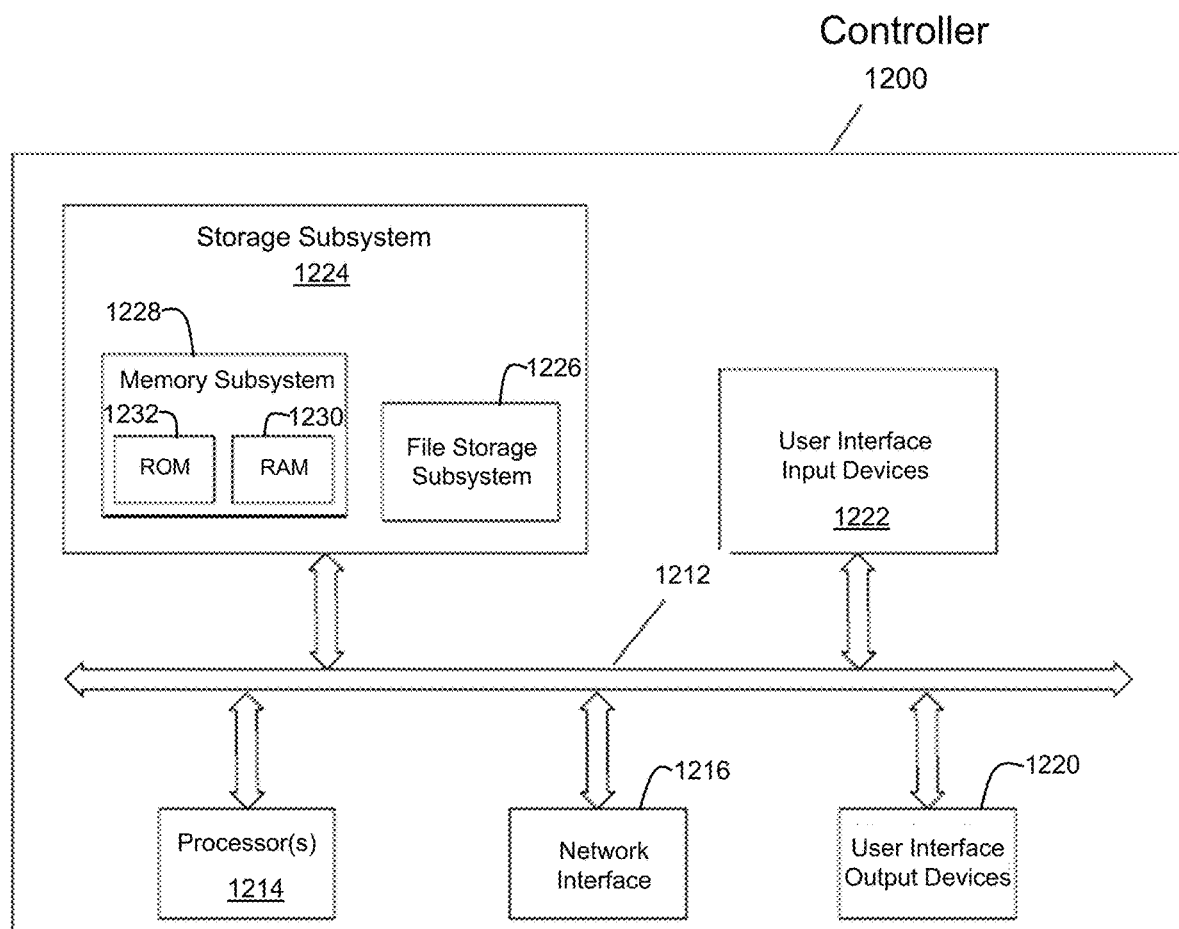
FIG. 12 illustrates an example embodiment of a controller (e.g., a central controller or a cell controller used in the systems described herein).

FIG. 12 illustrates an example embodiment of a controller 1200 (e.g., a central controller 220 or 320 or a cell controller 76 used in the systems described herein). The controller 1200 includes at least one processor 1214 which communicates with a number of peripheral devices via bus subsystem 1212. These peripheral devices may include a storage subsystem 1224, including, for example, a memory subsystem 1228 and a file storage subsystem 1226, user interface input devices 1222, user interface output devices 1220, and a network interface subsystem 1216. The input and output devices allow user interaction with the controller 1200. Network interface subsystem 1216 provides an interface to outside networks and is coupled to corresponding interface devices in other computer systems. For example, the cell controller 76 of the manufacturing cell 10 may share one or more characteristics with the controller 1200 and may be, for example, a conventional computer, a digital signal processor, and/or other computing device.

User interface input devices 1222 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 1200 or onto a communication network.

User interface output devices 1220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 1200 to the user or to another machine or computer system.

Storage subsystem 1224 stores programming and data constructs that provide or support some or all of the functionality described herein (e.g., as software modules). For example, the storage subsystem 1224 may include machine learning software modules that are used in a central controller to generate predictive models for supporting predictive and preventative maintenance of components of equipment within manufacturing cells.

Software modules are generally executed by processor 1214 alone or in combination with other processors. Memory 1228 used in the storage subsystem can include a number of memories including a main random access memory (RAM) 1230 for storage of instructions and data during program execution and a read only memory (ROM) 1232 in which fixed instructions are stored. A file storage subsystem 1226 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 1226 in the storage subsystem 1224, or in other machines accessible by the processor(s) 1214.

Bus subsystem 1212 provides a mechanism for letting the various components and subsystems of the controller 1200 communicate with each other as intended. Although bus subsystem 1212 is shown schematically as a single bus, alternative embodiments of the bus subsystem may use multiple buses.

The controller 1200 can be of varying types including a workstation, server, computing cluster, blade server, server farm, or any other data processing system or computing device. Due to the ever-changing nature of computing devices and networks, the description of the controller 1200 depicted in FIG. 12 is intended only as a specific example for purposes of illustrating some embodiments. Many other configurations of the controller 1200 are possible having more or fewer components than the controller depicted in FIG. 12.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. A system supporting predictive and preventative maintenance, the system comprising:
    a plurality of manufacturing cells within a manufacturing environment, wherein each manufacturing cell of the plurality of manufacturing cells includes a cell controller and at least one of welding equipment, cutting equipment, or additive manufacturing equipment;
    a central controller; and
    a communication network operatively connected to the central controller and the plurality of manufacturing cells and configured to support data communications between the central controller and the cell controller of each of the plurality of manufacturing cells,
    wherein the central controller is configured to:
        collect cell data over time from the cell controller of each of the plurality of manufacturing cells, via the communication network, wherein the cell data is related to at least one of operation, performance, or servicing of a same component type of each of the plurality of manufacturing cells to form a set of aggregated cell data for the component type, wherein a component of the component type is associated with the at least one of the welding equipment, the cutting equipment, or the additive manufacturing equipment and is not a weld, and wherein the cell data includes feedback data indicating a percent of degradation of components of the component type, and
        and analyze the set of aggregated cell data, including the feedback data, to generate an updated predictive model related to future maintenance of the component type.

2. The system of claim 1:
    wherein the central controller is configured to communicate the updated predictive model, via the communication network, to the cell controller of each of the plurality of manufacturing cells, respectively, and wherein the cell controller of each of the plurality of manufacturing cells is configured to, respectively, execute the updated predictive model to determine when a component of the component type should be serviced or replaced.

3. The system of claim 1, wherein the central controller is configured to:

execute the updated predictive model to determine when a component of the component type should be serviced or replaced for each of the plurality of manufacturing cells, respectively, and report when the component should be serviced or replaced to each of the plurality of manufacturing cells, respectively, via the communication network.

4. The system of claim 1, wherein the updated predictive model includes at least one of a predictive algorithm, a predictive equation, or predictive trend data.

5. The system of claim 1, wherein the component of the component type includes one of a contact tip, a gas nozzle, a wire conduit, a wire liner, an electrical cable, a wire drive roll, a tool fixture or clamp, an air filter, or a robot joint.

6. The system of claim 1, wherein the plurality of manufacturing cells are robotic manufacturing cells.

7. The system of claim 1, wherein the plurality of manufacturing cells are semi-automatic manufacturing cells.

8. The system of claim 1, further comprising at least one sensor associated with a component of the component type in each of the plurality of manufacturing cells, respectively, wherein the at least one sensor is configured to sense at least one parameter associated with the operation, the performance, or the servicing of the component and report the at least one parameter, directly or indirectly, to the respective cell controller as the cell data.

9. The system of claim 1, wherein the central controller is configured to send messages, via the communication network, to at least one mobile communication device associated with at least one maintenance person indicating when a component of the component type should be serviced or replaced.

10. The system of claim 1, wherein the communication network is configured to facilitate wireless communication between the central controller and each cell controller of the plurality of manufacturing cells.

* * * * *